(12) United States Patent
Wang (10) Patent No.: US 7,957,523 B2
(45) Date of Patent: Jun. 7, 2011

(54) METHOD AND SYSTEM FOR IMPLEMENTING A RING BACK TONE BASED ON GROUP MOBILE SWITCHBOARD SERVICE

(75) Inventor: Sheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 712 days.

(21) Appl. No.: 11/596,995

(22) PCT Filed: May 23, 2006

(86) PCT No.: PCT/CN2006/001074
§ 371 (c)(1),
(2), (4) Date: Feb. 14, 2008

(87) PCT Pub. No.: WO2006/128360
PCT Pub. Date: Dec. 7, 2006

(65) Prior Publication Data
US 2008/0253536 A1 Oct. 16, 2008

(30) Foreign Application Priority Data
Jun. 1, 2005 (CN) .......................... 2005 1 0073505

(51) Int. Cl.
*H04M 3/42* (2006.01)
(52) U.S. Cl. ...................... 379/418; 455/567; 455/414.1
(58) Field of Classification Search .................... None
See application file for complete search history.

(56) References Cited

U.S. PATENT DOCUMENTS

| 5,844,968 | A  * | 12/1998 | Choi | .......................... | 379/88.25 |
| 2002/0025831 | A1 * | 2/2002 | Kim | .............................. | 455/554 |
| 2004/0120494 | A1 | 6/2004 | Jiang et al. | | |
| 2004/0174983 | A1 | 9/2004 | Oschwang et al. | | |
| 2007/0291931 | A1 * | 12/2007 | DeMent | ........................ | 379/418 |

FOREIGN PATENT DOCUMENTS

| CN | 1514562 A | 7/2004 |
| CN | 1571323 A | 1/2005 |
| CN | 1604601 A | 4/2005 |
| CN | 100591171 C | 2/2010 |

(Continued)

OTHER PUBLICATIONS

Office Action dated Jul. 10, 2009 in connection with Chinese Patent Application No. 200680012054.3.

(Continued)

*Primary Examiner* — Lester Kincaid
*Assistant Examiner* — Phuoc Doan (57) ABSTRACT

This invention discloses a method and system of implementing a ring back tone based on a group mobile switchboard service. The method includes: a home service control point of the group mobile switchboard obtaining an identification of an extension subscriber which a calling party calls, and sending routing information of a ring back tone intelligent peripheral and the identification of the called extension subscriber to a gateway mobile switching center/mobile switching center which triggers the intelligent service; the gateway mobile switching center/mobile switching center routing the identification of the called extension subscriber to the ring back tone intelligent peripheral according to the received routing information of the ring back tone intelligent peripheral; the ring back tone intelligent peripheral connecting the call to a visited mobile switching center of the called extension subscriber, and playing a group ring back tone subscribed to by the group customer for the calling party.

12 Claims, 7 Drawing Sheets

FOREIGN PATENT DOCUMENTS

| | | |
|---|---|---|
| EP | 1 523 199 A1 | 4/2005 |
| WO | WO 2004/016015 A1 | 2/2004 |
| WO | WO 2004/016029 A1 | 2/2004 |
| WO | WO 2004/021688 A1 | 3/2004 |
| WO | WO 2004/036944 A1 | 4/2004 |
| WO | WO 2004/095817 A1 | 11/2004 |
| WO | WO 2004107722 A1 | 12/2004 |

OTHER PUBLICATIONS

Communication pursuant to Article 94(3) EPC dated Oct. 7, 2009 in connection with European Patent Application No. 06 741 962.2.

Communication pursuant to Article 94(3) EPC dated Feb. 26, 2008 in connection with European Patent Application No. 06 741 962.2.

Written Opinion of the International Searching Authority dated Jul. 13, 2006 in connection with International Patent Application No. PCT/CN2006/001074.

Wang Yulong, et al., "Solutions Supporting Color Ring Service for CSI Subscribers in MIN", Jan. 2004, p. 8-10.

Supplementary European Search Report from European Patent Application 06741692.

\* cited by examiner

METHOD AND SYSTEM FOR IMPLEMENTING A RING BACK TONE BASED ON GROUP MOBILE SWITCHBOARD SERVICE

FIELD OF THE INVENTION

The present invention relates to the field of intelligent network technology, and particularly to a method and system for implementing a ring back tone based on a group mobile switchboard service.

BACKGROUND OF THE INVENTION

A group mobile switchboard service allocates for a group customer a normal MSISDN (Mobile Station International ISDN (Integrated Services Digital Network) Number) as the group mobile switchboard number, and provides a service such as automatic switchboard, voice controlled switchboard, manual switchboard, etc., via the group mobile switchboard number, and also provides a service such as telephone number inquiry, telephone transfer, etc. After dialing the group mobile switchboard number, a calling party may dial an extension number (for an automatic switchboard) directly, say the called party's name (for a voice controlled switchboard) so as to be transferred to the extension subscriber, or connect to a manual agent (for a manual switchboard) to be transferred by an operator.

A subscriber-based ring back tone service is a service subscribed to by a called party, which provides a calling party a piece of pleasant music or greetings instead of a normal ring back tone during a call. After a subscriber-based ring back tone service has been activated upon application of a customer, the customer may subscribe to a subscriber-based ring back tone individually such that when he is called, the subscribed personalized music or record will be played for the calling party, instead of a normal ring back tone. When the called party is in a non-idle status, such as being busy, out of service, power off, etc., an original voice message provided by the network system will still be played.

A current ring back tone service based on a group mobile switchboard service (i.e., a group ring back tone service) is an extension of the subscriber-based ring back tone described above, which is mainly for a group customer, provides a group ring back tone related to the group according to the group customer's requirement, and allows each of the customers in the group who have applied for a subscriber-based ring back tone to set the group ring back tone as his own subscriber-based ring back tone, according to the requirement of the group customer, or sets the group ring back tone provided by the group customer as a default ring back tone for every customer in the group in a specified period of time according to the requirement of the group customer.

Figure 1:
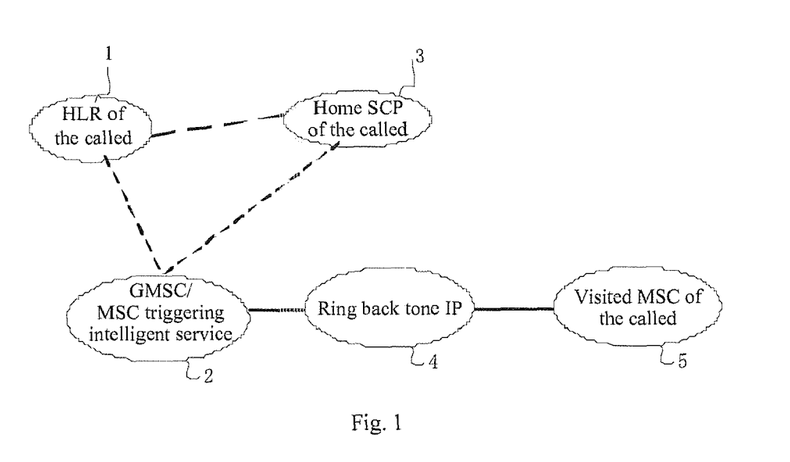
FIG. 1 shows a schematic diagram illustrating a current networking architecture for implementing a ring back tone service based on a mobile intelligent network.

To implement a subscriber-based ring back tone service and a group ring back tone service based on an intelligent network, equipment in a mobile intelligent network, such as a Service Control Point (SCP), an Intelligent Peripheral (IP), etc., is needed. Referring to FIG. 1, there is shown a schematic diagram illustrating a current networking architecture for implementing a ring back tone service based on a mobile intelligent network, wherein T-CSI (Terminating CAMEL (Customized Applications for Mobile network Enhanced Logic) Subscription Information) is registered for a called number (a personal mobile number or a group mobile switchboard number) in a Home Location Register (HLR) 1; when a calling party calls a called party which has subscribed to a ring back tone service, a Gateway Mobile Switching Center (GMSC)/Mobile Switching Center (MSC) 2 which triggers the intelligent service will trigger a mobile terminated of the intelligent service for the called party to a home SCP 3 of the called party; the SCP 3 instructs the GMSC/MSC 2 to connect the call to a ring back tone IP 4, and establishes a call connection with the called party through a bridging function of the ring back tone IP 4; the ring back tone IP 4 plays a group ring back tone subscribed to by the group which the called party belongs to or a subscriber-based ring back tone subscribed to by the called party individually, and blocks a normal ring back tone sent by a visited MSC 5 of the called party.

Figure 2:
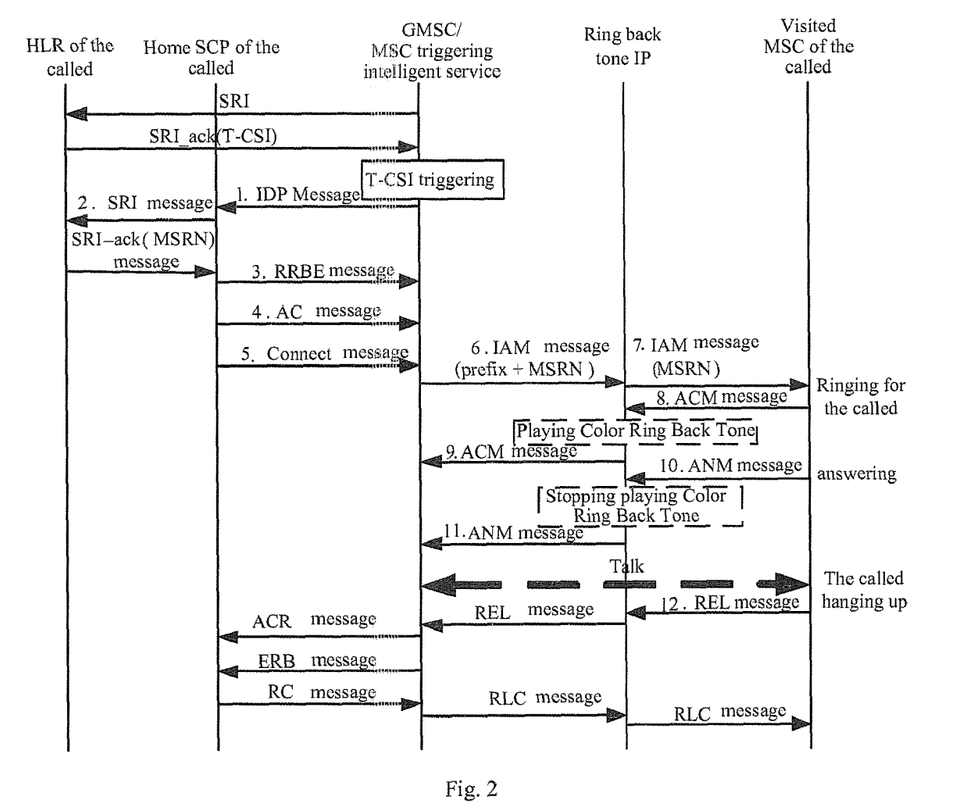
FIG. 2 is a flow diagram illustrating a current signaling process of implementing a ring back service based on a mobile intelligent network.

FIG. 2 is a current signaling processing flow of implementing a ring back tone service based on a mobile intelligent network, the detailed process of which is as follows.

1. When a calling party calls a called party who has subscribed to a ring back tone, a GMSC/MSC which triggers the intelligent service sends Send Routing Information (SRI) to an HLR of the called party, and the HLR returns Send Routing Information acknowledge (SRI_ack) to the GMSC/MSC which triggers the intelligent service, wherein the SRI_ack message includes registered T-CSI, and by sending an Initial Detect Point (IDP) message, the GMSC/MSC triggers a mobile terminated of the intelligent service to a home SCP of the called party.

2. When determining that the called party has subscribed to a ring back tone, the home SCP of the called party sends an SRI message to the HLR of the called party, and the HLR of the called party returns an SRI_ack massage bearing a Mobile Station Roaming Number (MSRN) of the called party.

3. The home SCP of the called party sends an RRBE (Request Report BCSM (Basic Call State Model) Event) message to the GMSC/MSC which triggers the intelligent service, requesting the GMSC/MSC to monitor an event such as abandoning of the calling party, hanging up, no answer from the called party, routing selection failure, etc.

4. The home SCP of the called party sends an Apply Charging (AC) message to the GMSC/MSC which triggers the intelligent service, instructing the GMSC/MSC to monitor talk time.

5. The home SCP of the called party sends a CONNECT message to the GMSC/MSC which triggers the intelligent service, instructing the GMSC/MSC to connect to a ring back tone IP; wherein the parameters included in the CONNECT message are shown in the following table:

| Name of information unit (parameter) | Meaning of parameter | Value or description of parameter |
| --- | --- | --- |
| destinationRoutingAddress | Destination routing address: the GMSC/MSC replacing the called number during a call with this parameter | The routing information for connecting to the IP + the called party's MSRN |
| redirectingPartyID | Redirecting number: the GMSC/MSC replacing the | The called party's MSISDN |

-continued

| Name of information unit (parameter) | Meaning of parameter | Value or description of parameter |
|---|---|---|
| | redirecting number during a call with this parameter | |
| redirectionInformation | Redirection Information: the GMSC/MSC replacing the redirection information during a call with this parameter | Cause and times of forwarding 00110011, 00110001 |
| originalCalledPartyID | Original called party's number: the GMSC/MSC replacing the original called party's number during a call with this parameter | The called party's MSISDN |

6. the GMSC/MSC which triggers the intelligent service sends an Initial Address Message (IAM) to the ring back tone IP, according to "the routing information for connecting to the IP", which is included in the destination routing address in the received CONNECT message, so as to route the call to the ring back tone IP.

7. The ring back tone IP removes such parameters as the routing information before the subscriber's MSRN, original called party's number, redirecting number, redirection information, etc., and then sends the IAM to the visited MSC of the called party, so as to continue to connect the call to the visited MSC of the called party.

8. After being connected to the called party, the visited MSC of the called party rings for the called party, and plays a normal ring back tone for the calling party by returning an Address Complete Message (ACM) to the ring back tone IP.

9. After receiving the ACM, the ring back tone IP blocks the normal ring back tone sent from the visited MSC of the called party, and plays a ring back tone subscribed to by the called party for the calling party according to the called party's MSISDN by sending an ACM to the GMSC/MSC which triggers the intelligent service; and the calling party receives the ring back tone.

10. After the called party has answered, the visited MSC of the called party sends an Answer message (ANM) to the ring back tone IP.

11. After receiving the ANM, the ring back tone IP stops playing the ring back tone, and sends an ANM to the GMSC/MSC which triggers the intelligent service; a talk between the calling and called parties begins.

12. The calling party hangs up or the called party hangs up, and the talk is over; FIG. 2 shows the signaling process in the case that the called party hangs up.

However, the above process of implementing a ring back tone service based on a mobile intelligent network can only implement the function that the network system plays a subscriber-based ring back tone subscribed to by a called party for a calling party when the calling party dials a personal mobile number; it can not implement the function that the network system plays for a calling party a group ring back tone which is subscribed to for a group mobile switchboard number during the transfer from the switchboard to an extension, when the calling party calls a subscriber in the group by dialing the group mobile switchboard number, i.e., it can not implement the function of playing a ring back tone which is subscribed to correspondingly to a called umber for a calling party when the called number is used as a relay number for transfer.

SUMMARY OF THE INVENTION

The disclosed embodiments provide a method and system for implementing a ring back tone based on a group mobile switchboard service, so as to play a group ring back tone subscribed to by a group customer for a calling party during the transfer from the switchboard to an extension when a group mobile switchboard number is used as a relay number for transfer.

The technical solution provided in an embodiment of the present invention may be as follows:

a method of implementing a ring back tone based on a group mobile switchboard service, including the following steps:

obtaining, by a home service control point of the group mobile switchboard, an identification of an extension subscriber which a calling party calls;

sending routing information of a ring back tone intelligent peripheral and the identification of the called extension subscriber respectively to a gateway mobile switching center/mobile switching center which triggers the intelligent service;

routing the identification of the called extension subscriber to the ring back tone intelligent peripheral according to the routing information of the ring back tone intelligent peripheral, by the gateway mobile switching center/mobile switching center which triggers the intelligent service;

connecting the call to a visited mobile switching center of the called extension subscriber, by the ring back tone intelligent peripheral; and playing a group ring back tone subscribed to by the group customer for the calling party.

The process of obtaining an identification of an extension subscriber which a calling party calls by a home service control point of the group mobile switchboard includes the following steps in detail:

dialing, by a calling party, a group mobile switchboard number which has been applied for a group ring back tone, to call an extension subscriber of the group mobile switchboard;

performing interaction between an intelligent peripheral of the group mobile switchboard and the calling party via a gateway mobile switching center/mobile switching center which triggers the intelligent service, to obtain an identification of the extension subscriber which the calling party calls;

encapsulating the identification of the extension subscriber into a script event message to report to the home service control point of the group mobile switchboard, by the intelligent peripheral of the group mobile switchboard.

Sending routing information of a ring back tone intelligent peripheral and the identification of the called extension subscriber to the gateway mobile switching center/mobile switching center which triggers the intelligent service by the home service control point of the group mobile switchboard includes bearing the routing information of the ring back tone intelligent peripheral and the identification of the called extension subscriber in a connect message.

Routing the identification of the called extension subscriber to the ring back tone intelligent peripheral according to the routing information of the ring back tone intelligent peripheral by the gateway mobile switching center/mobile switching center which triggers the intelligent service includes bearing the identification of the called extension subscriber in an initial address message.

After connecting the call to a visited mobile switching center of the called extension subscriber by the ring back tone intelligent peripheral, the method further includes: calling the called extension subscriber, and playing a ring back tone for the ring back tone intelligent peripheral before the called extension subscriber answers, by the visited mobile switching center of the called extension subscriber; when playing a group ring back tone subscribed to by the group customer for the calling party by the ring back tone intelligent peripheral, the method also includes blocking the ring back tone played by the visited mobile switching center of the called extension subscriber.

When connecting the call to a visited mobile switching center of the called extension subscriber, the visited mobile switching center of the called extension subscriber is determined by the ring back tone intelligent peripheral according to the identification of the called extension subscriber.

The process of determining the visited mobile switching center of the called extension subscriber according to the identification of the called extension subscriber includes in detail:

determining a home location register of the called extension subscriber according to the identification of the called extension subscriber, by the ring back tone intelligent peripheral;

obtaining a mobile station roaming number of the called extension subscriber from the home location register of the called extension subscriber;

determining the visited mobile switching center of the called extension subscriber according to the mobile station roaming number of the called extension subscriber by the ring back tone intelligent peripheral.

After playing a group ring back tone subscribed to by the group customer for the calling party by the ring back tone intelligent peripheral, the method also includes:

answering by the called extension subscriber and sending a answer message to the ring back tone intelligent peripheral by the visited mobile switching center of the called extension subscriber;

forwarding the answer message to the gateway mobile switching center/mobile switching center which triggers the intelligent service by the ring back tone intelligent peripheral, and stopping playing the group ring back tone for the calling party.

When connecting the call to a visited mobile switching center of the called extension subscriber, the identification of the called extension subscriber is forwarded to a corresponding transfer gateway mobile switching center/mobile switching center by the ring back tone intelligent peripheral according to the identification of the called extension subscriber;

the visited mobile switching center of the called extension subscriber is determined by the transfer gateway mobile switching center/mobile switching center according to the identification of the called extension subscriber.

The process of determining the visited mobile switching center of the called extension subscriber according to the identification of the called extension subscriber includes in detail:

determining a home location register of the called extension subscriber according to the identification of the called extension subscriber, by the transfer gateway mobile switching center/mobile switching center;

obtaining a mobile station roaming number of the called extension subscriber from the home location register of the called extension subscriber;

determining the visited mobile switching center of the called extension subscriber according to the mobile station roaming number of the called extension subscriber by the transfer gateway mobile switching center/mobile switching center.

After playing a group ring back tone subscribed to by the group customer for the calling party by the ring back tone intelligent peripheral, the method also includes:

answering by the called extension subscriber and sending a answer message to the transfer gateway mobile switching center/mobile switching center by the visited mobile switching center of the called extension subscriber;

forwarding the answer message to the ring back tone intelligent peripheral by the transfer gateway mobile switching center/mobile switching center;

forwarding the answer message to the gateway mobile switching center/mobile switching center which triggers the intelligent service by the ring back tone intelligent peripheral, and stopping playing the group ring back tone for the calling party.

The method also includes:

sending an address complete message bearing status information of the called extension subscriber to the ring back tone intelligent peripheral by the visited mobile switching center of the called extension subscriber, before answering by the called extension subscriber;

before playing a group ring back tone for the calling party, the method also includes:

determining whether the current status of the called extension subscriber is idle according to the status information of the called extension subscriber borne in the address complete message sent from the visited mobile switching center of the called extension subscriber, by the ring back tone intelligent peripheral.

The group ring back tone played for the calling party is determined by the ring back tone intelligent peripheral according to the group mobile switchboard number dialed by the calling party, or according to a relationship between the group mobile switchboard number dialed by the calling party and an identification of the calling party.

An embodiment of the present invention provides a system for implementing a ring back tone based on a group mobile switchboard service, including a home service control point of the group mobile switchboard, a gateway mobile switching center/mobile switching center which triggers the intelligent service, a ring back tone intelligent peripheral and a visited mobile switching center of a called extension subscriber;

after obtaining an identification of the called extension subscriber which the calling party calls, the home service control point of the group mobile switchboard is used to send routing information of the ring back tone intelligent peripheral and the identification of the called extension subscriber respectively to the gateway mobile switching center/mobile switching center which triggers the intelligent service;

the gateway mobile switching center/mobile switching center which triggers the intelligent service is used to route the identification of the called extension subscriber to the ring back tone intelligent peripheral according the routing information of the ring back tone intelligent peripheral;

the ring back tone intelligent peripheral is used to connect the call to the visited mobile switching center of the called extension subscriber, and play a group ring back tone subscribed to by the group customer for the calling party.

The system also includes an intelligent peripheral of the group mobile switchboard, which is used to interact with the calling party via the gateway mobile switching center/mobile switching center which triggers the intelligent service, to obtain the identification of the extension subscriber called by the calling party, and to encapsulate the identification of the extension subscriber into a script event message to report to the home service control point of the group mobile switchboard.

The ring back tone intelligent peripheral determines a home location register of the called extension subscriber according to the identification of the called extension subscriber, obtains a mobile station roaming number of the called extension subscriber from the home location register of the called extension subscriber, and determines the visited mobile switching center of the called extension subscriber according to the mobile station roaming number of the called extension subscriber.

The system also includes a transfer gateway mobile switching center/mobile switching center; the ring back tone intelligent peripheral forwards the identification of the called extension subscriber to the corresponding transfer gateway mobile switching center/mobile switching center according to the identification of the called extension subscriber; the transfer gateway mobile switching center/mobile switching center determines the visited mobile switching center of the called extension subscriber according to the identification of the called extension subscriber.

The ring back tone intelligent peripheral determines the group ring back tone according to a group mobile switchboard number dialed by the calling party, or according to a relationship between a group mobile switchboard number dialed by the calling party and an identification of the calling party.

The embodiments of the present invention provide a method and system for implementing a ring back tone based on a group mobile switchboard service, wherein when a group mobile switchboard number is dialed by a calling party to call an extension subscriber in the group, by determining an identification of the called extension subscriber which the calling party calls, and according to the identification of the called extension subscriber, the call is connected to a visited mobile switching center (VMSC) of the called extension subscriber, and then a group ring back tone which is subscribed to for the group mobile switchboard number is played by a ring back tone intelligent peripheral, so that when the calling party calls the extension subscriber in the group by dialing the group mobile switchboard number, the network system can play the group ring back tone subscribed to by the group customer for the calling party during the transfer from the switchboard to the extension. Accordingly, the network system can play a ring back tone which is subscribed to correspondingly to the called number for the calling party when the called number is used as a relay number for transfer; thus it promotes the spread of a group mobile switchboard service and a ring back tone service.

DETAILED DESCRIPTIONS OF THE EMBODIMENTS

Figure 3:
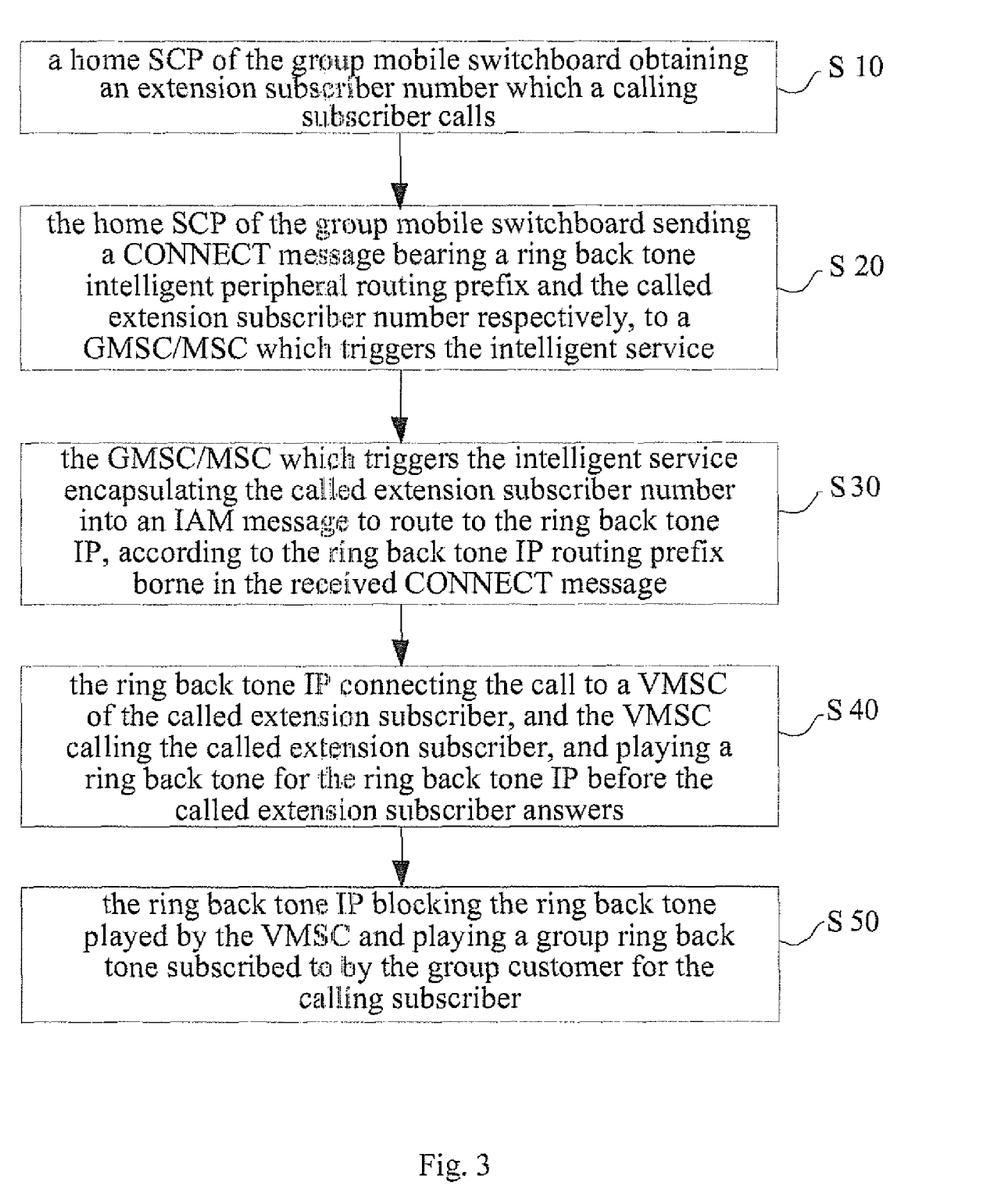
FIG. 3 shows a flow diagram illustrating the main implementation principle of an embodiment of the invention.

Referring to FIG. 3, there is shown a flow diagram illustrating the main implementation principle of an embodiment of the invention, and the main process of implementing a ring back tone based on a group mobile switchboard service according to an embodiment of the present invention may be as follows:

step S10, a home SCP of the group mobile switchboard obtaining identification information of an extension subscriber to be called by a calling party (e.g., called extension number information of the called extension subscriber, etc.);

step S20, the home SCP of the group mobile switchboard sending a CONNECT message, which bears routing information of a ring back tone IP and the identification of the called extension subscriber respectively, to a Gateway Mobile Switching Center (GMSC)/Mobile Switching Center (MSC) which triggers the intelligent service;

step S30, the GMSC/MSC which triggers the intelligent service encapsulating the identification of the called extension subscriber into an Initial Address Message (IAM) to route to the ring back tone IP, according to the routing information of the ring back tone IP borne in the received CONNECT message.

step S40, the ring back tone IP connecting the call directly or indirectly to an Visited Mobile Switching Center (VMSC) of the called extension subscriber, and the VMSC of the called extension subscriber calling the called extension subscriber, playing a ring back tone for the ring back tone IP before the called extension subscriber answers, and sending an Address Complete Message (ACM), which bears status information of the called extension subscriber, to the ring back tone IP;

step S50, the ring back tone IP determining whether the current status of the called extension subscriber is idle according to the status information of the called extension subscriber borne in the ACM sent from the VMSC of the called extension subscriber, and if the result of the determination is that the current status of the called extension subscriber is idle, blocking the ring back tone played by the VMSC of the called extension subscriber and playing a group ring back tone subscribed to by the group customer for the calling party;

wherein the group ring back tone played by the ring back tone IP for the calling party is determined by the ring back tone IP either according to a group mobile switchboard number dialed by the calling party, or according to a relationship between a group mobile switchboard number dialed by the calling party and an identification of the calling party, which mainly applies to the case that the same group mobile switchboard can subscribe to different ring back tones for different calling parties.

In step S40, the VMSC of the called extension subscriber may be determined in two ways:

the first is to determine by the ring back tone IP directly according to the identification of the called extension subscriber encapsulated in the received IAM, in which case it is required that the ring back tone IP has the capability of determining a VMSC of a called extension subscriber according to an identification of the called extension subscriber;

the second is that the ring back tone IP forwards the identification of the called party, which is encapsulated in the received IAM message, to a corresponding transfer GMSC/MSC, so as to determine by the transfer GMSC/MSC according to the identification of the called party encapsulated in the received IAM message.

Figure 4:
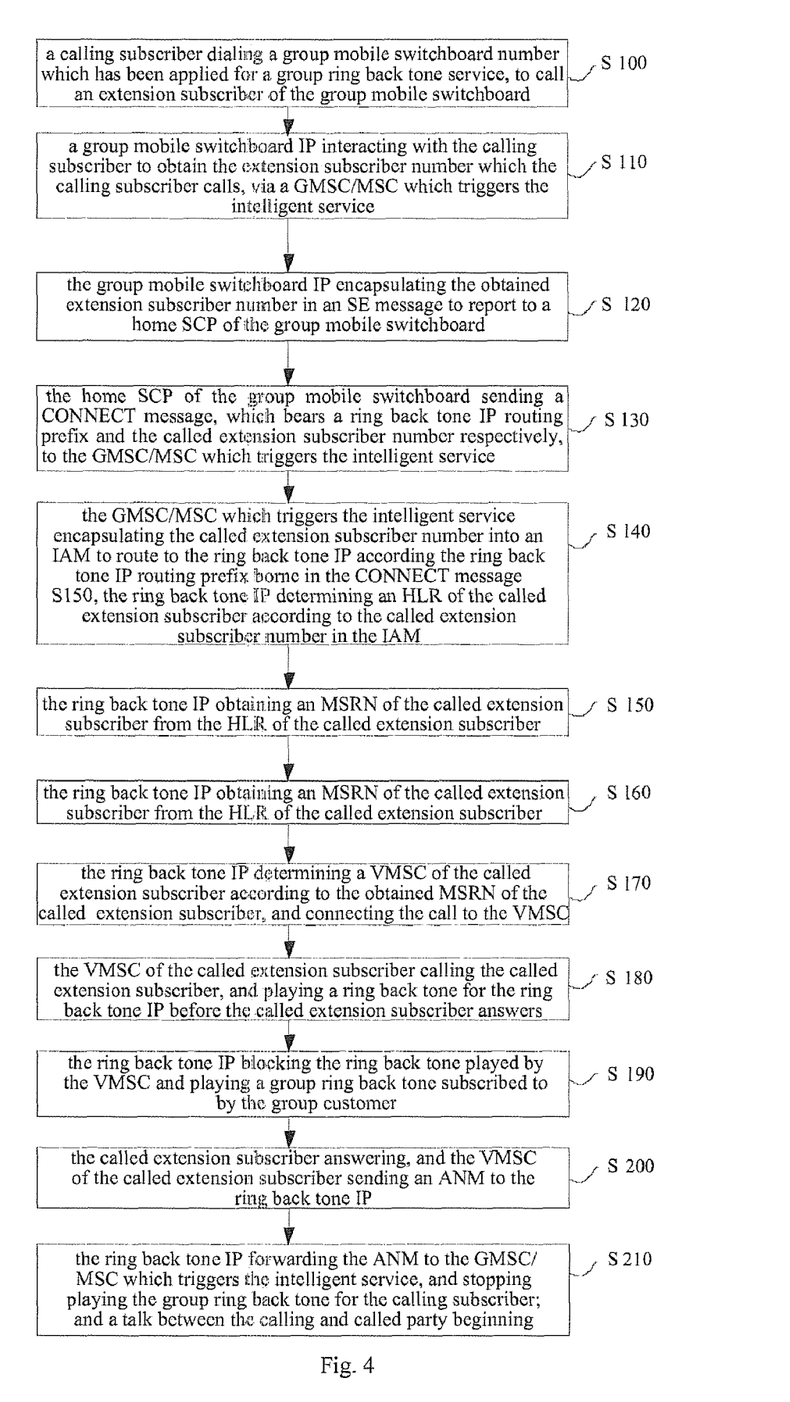
FIG. 4 is a flow diagram illustrating an embodiment of the present invention, which is implemented in a manner that a ring back tone IP determines a VMSC of a called extension subscriber according to an identification of the called extension subscriber encapsulated in an IAM message.

Referring to FIG. 4, there is shown a flow diagram illustrating an embodiment of the present invention, which is implemented in a manner that a ring back tone IP determines a VMSC of a called extension subscriber according to an identification of the called extension subscriber encapsulated in an IAM message, the process of which may be as follows:

step S100, a calling party dialing a group mobile switchboard number which has been applied for a group ring back tone service, to call an extension subscriber of the group mobile switchboard;

step S110, an IP of the group mobile switchboard interacting with the calling party via a GMSC/MSC which triggers the intelligent service, to obtain an identification of the called extension subscriber which the calling party calls;

step S120, the IP of the group mobile switchboard encapsulating the obtained identification of the called extension subscriber into a script Event (SE) message to report to a home SCP of the group mobile switchboard;

step S130, the home SCP of the group mobile switchboard sending a CONNECT message, which bears routing information of a ring back tone IP and the identification of the called extension subscriber respectively, to the GMSC/MSC which triggers the intelligent service;

step S140, the GMSC/MSC which triggers the intelligent service encapsulating the identification of the called extension subscriber into an IAM to route to the ring back tone IP according to the routing information of the ring back tone IP borne in the received CONNECT message;

step S150, the ring back tone IP determining an HLR of the called extension subscriber according to the received identification of the called extension subscriber;

step S160, the ring back tone IP obtaining a Mobile Station Roaming Number (MSRN) of the called extension subscriber from the HLR of the called extension subscriber;

step S170, the ring back tone IP determining a VMSC of the called extension subscriber according to the above-obtained MSRN of the called extension subscriber;

step S180, the VMSC of the called extension subscriber calling the called extension subscriber, and playing a ring back tone (including a normal ring back tone and a subscriber-based ring back tone subscribed to by the called extension subscriber) for the ring back tone IP before the called extension subscriber answers, supposing that the called extension subscriber is in an idle status;

step S190, the ring back tone IP blocking the ring back tone played by the VMSC of the called extension subscriber (including the normal ring back tone and the subscriber-based ring back tone subscribed to by the called extension subscriber), and playing a group ring back tone subscribed to by the group customer instead;

step S200, after the called extension subscriber answers, the VMSC of the called extension subscriber sending an Answer Message (ANM) to the ring back tone IP;

step S210, the ring back tone IP forwarding the ANM to the GMSC/MSC which triggers the intelligent service, and stopping playing the group ring back tone for the calling party; a talk between the calling party and the called party beginning.

Figure 5:
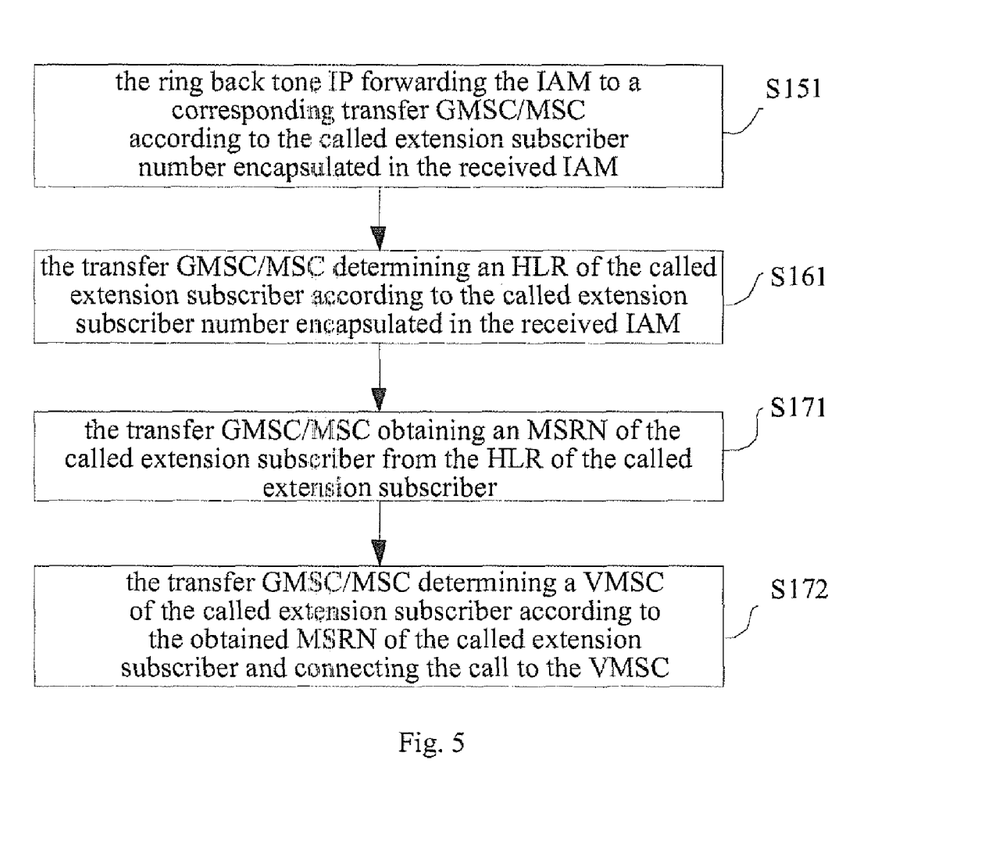
FIG. 5 is a flow diagram illustrating the process that a transfer GMSC/MSC determines a VMSC of a called extension subscriber according to an identification of the called extension subscriber encapsulated in an IAM message.

If the present invention adopts a solution that the ring back tone IP forwards the received IAM to a corresponding transfer GMSC/MSC according to the identification of the called extension subscriber, which is encapsulated in the received IAM, and then the transfer GMSC/MSC determines the VMSC of the called extension subscriber according to the identification of the called party encapsulated in the received IAM message, steps S150~S170 in FIG. 4 should be replaced by steps S151~S172 shown in FIG. 5, and the process of determining a VMSC of the called extension subscriber is as follows:

step S151, the ring back tone IP forwarding the received IAM to a corresponding transfer GMSC/MSC according to the identification of the called extension subscriber encapsulated in the received IAM;

step S161, the transfer GMSC/MSC determining an HLR of the called extension subscriber according to the identification of the called extension subscriber encapsulated in the received IAM;

step S171, the transfer GMSC/MSC obtaining an MSRN of the called extension subscriber from the HLR of the called extension subscriber;

step S172, the transfer GMSC/MSC determining a VMSC of the called extension subscriber according to the above-obtained MSRN of the obtained called extension subscriber, so as to connect the call to the VMSC of the called extension subscriber.

Figure 6:
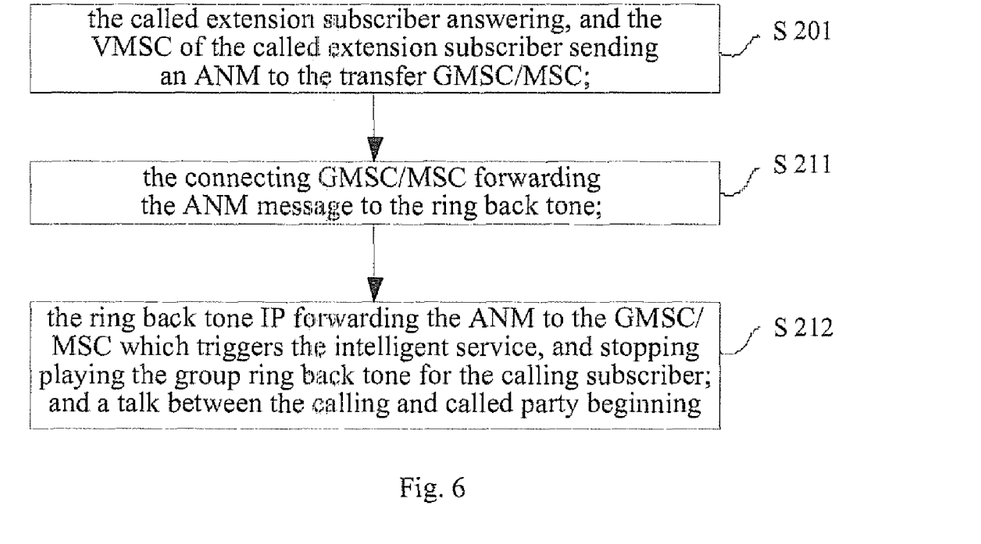
FIG. 6 is a flow diagram illustrating the process that a ring back tone IP stops playing a group ring back tone for a calling party when a transfer GMSC/MSC determines a VMSC of a called extension subscriber according to an identification of the called extension subscriber encapsulated in an IAM message.

Correspondingly, steps S200~S210 in FIG. 4 should be replaced by steps S201~S212 shown in FIG. 6, and the process that the ring back tone IP stops playing the group ring back tone for the calling party is as follows:

step S201, after the called extension subscriber answers, the VMSC of the called extension subscriber sending an ANM to the transfer GMSC/MSC;

step S211, the transfer GMSC/MSC forwarding the ANM to the ring back tone IP;

step S212, the ring back tone IP forwarding the ANM to the GMSC/MSC which triggers the intelligent service, and stopping playing the group ring back tone for the calling party; a talk between the calling party and the called party beginning.

Figure 7:
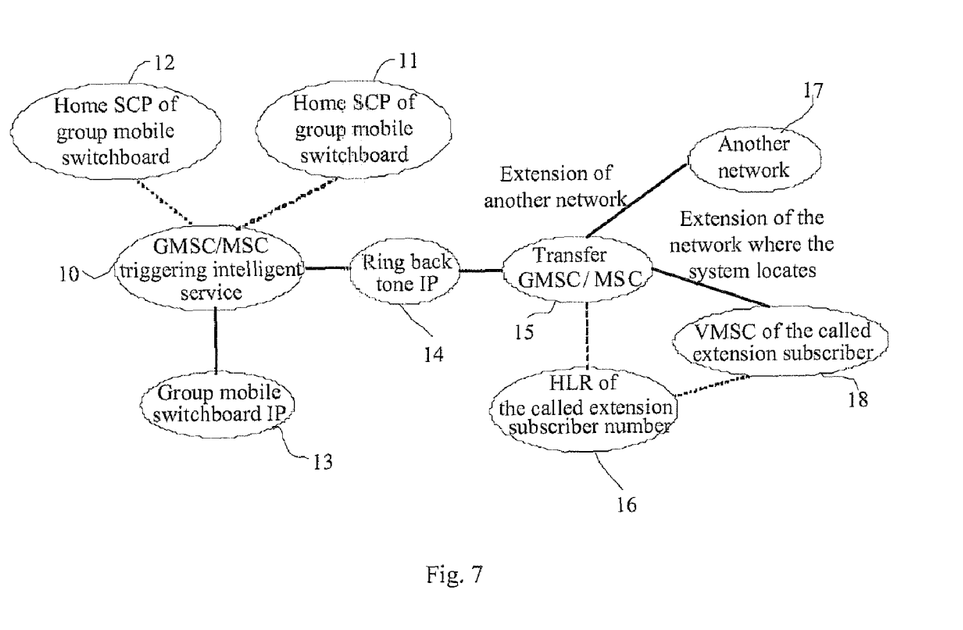
FIG. 7 is a schematic diagram illustrating the architecture of a network system for implementing an embodiment of the present invention.

Referring to FIG. 7, there is shown a schematic diagram illustrating the architecture of a network system for implementing an embodiment of the present invention, wherein a GMSC/MSC 10 which triggers the intelligent service originates a call or connect a call to an exchange of the network within which the system locates (if the calling terminal may be a terminal of another network, the call is connected to a GMSC of the network within which the system locates first); an HLR 11 of the group mobile switchboard records subscription information of a group mobile switchboard intelligent service for a group mobile switchboard number; a home SCP 12 of the group mobile switchboard processes the group mobile switchboard and group ring back tone service logic; a group mobile switchboard IP 13 interacts with a calling party to determine an extension number to be transferred to; a ring back tone IP 14 provides a group ring back tone; a transfer GMSC/MSC 15 transfers a call to a called extension subscriber. Based on the network system architecture illustrated in FIG. 7, the main process of implementing a ring back tone based on a group mobile switchboard service according to an embodiment of the present invention is as follows.

A calling party dials a group mobile switchboard number. A GMSC/MSC 10 triggers an intelligent service to a home SCP 12 of the group mobile switchboard. After obtaining an identification of an extension subscriber which the calling party is to be connected to from a group mobile switchboard IP 13, if the home SCP 12 of the group mobile switchboard determines the group, which the extension subscriber to be connected to belongs to, has subscribed to a group ring back tone service, the home SCP 12 instructs the GMSC/MSC 10 which triggers the intelligent service to connect the call to a ring back tone IP 14. The ring back tone IP 14 connects the call to a transfer GMSC/MSC 15 utilizing a bridging function. If the called extension subscriber is a subscriber of another network, the transfer GMSC/MSC 15 continues to connect the call to a corresponding network 17 other than the one within which the system locates, and the connection to the called extension subscriber is made by the network 17. If the called extension subscriber is a subscriber of the network within which the system locates, after obtaining an MSRN of the called extension subscriber from an HLR 16 of the called extension subscriber, the transfer GMSC/MSC 15 connects the call to a VMSC 18 of the called extension subscriber (if the ring back tone IP has a function of obtaining a MSRN of a called extension subscriber from a HLR of the called extension subscriber, the ring back tone IP 14 can connect the call to a VMSC 18 of the called extension subscriber without the transfer GMSC/MSC 15). The VMSC 18 of the called extension subscriber, or exchange equipment of another network where the extension of another network locates, rings for the called extension subscriber, and returns an ACM to the calling side. When determining that the status of the called extension subscriber is idle according to the ACM, the ring back tone IP 14 blocks the ring back tone played by the VMSC 18 of the called extension subscriber or the exchange of another network where the extension of another network locates, and choose a corresponding group ring back tone to play for the calling side, according to the group mobile switchboard number or a relationship between the group mobile switchboard number and an identification of the calling party (in the case that the same group mobile switchboard can subscribe to different ring back tones for different calling parties). When receiving the ANM returned from the called side, the ring back tone IP 14 stops playing the group ring back tone for the calling side, and a talk between the calling and called party begins.

Figure 8:
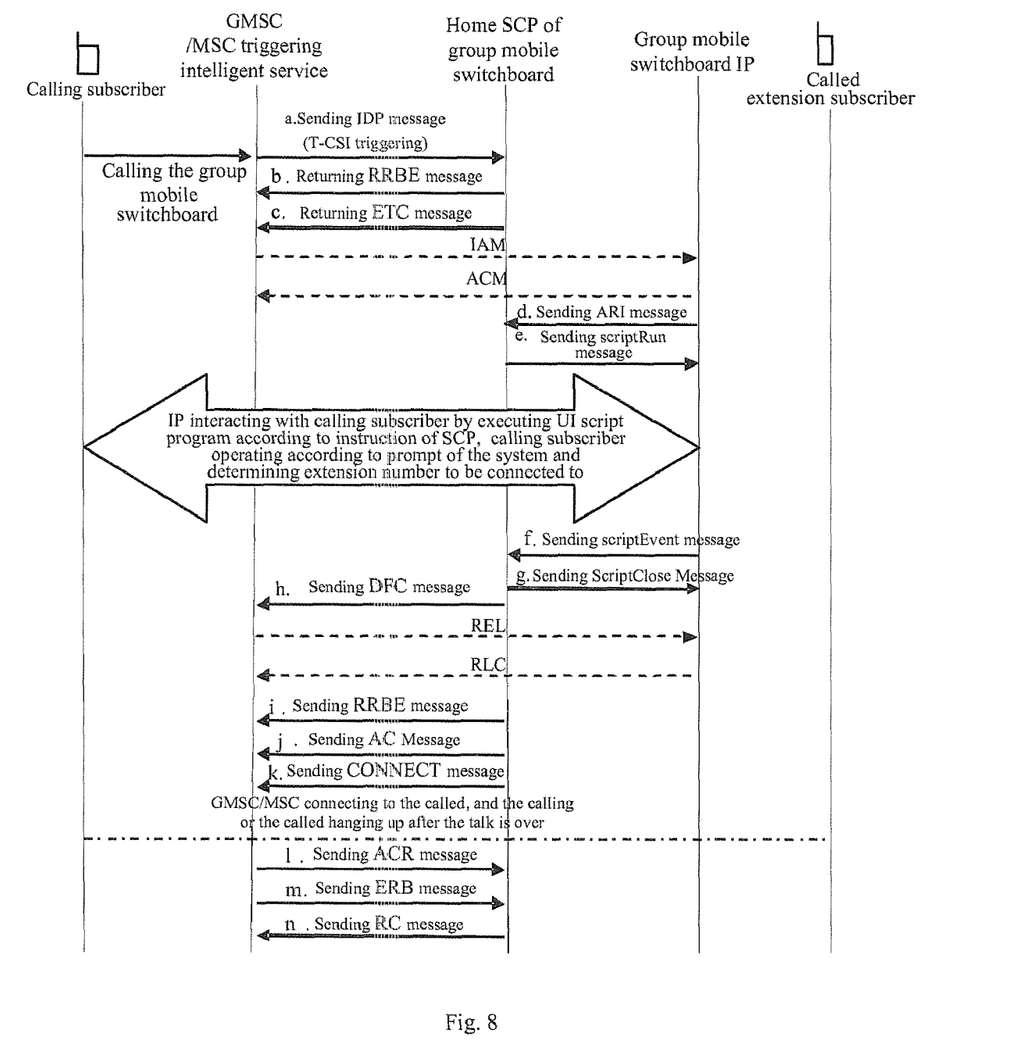
FIG. 8 is a schematic diagram illustrating the process of call connecting when a calling party dials a group mobile switchboard number to call an extension subscriber in a group mobile switchboard service.

FIG. 8 is a schematic diagram illustrating the process of call connecting when a calling party dials a group mobile switchboard number to call an extension subscriber in a group mobile switchboard service. If the calling party, the group mobile switchboard number and the called extension subscriber which is transferred to are all intelligent subscribers, they all have their own intelligent flows. Herein, only a mobile terminated signaling for the group mobile switchboard number is described, the detailed process of which is as follows:

a. a calling party (it may be a wired telephone, a mobile phone, etc.) dialing a group mobile switchboard number, a GMSC/MSC which triggers the intelligent service sending Send Routing Information (SRI) to an HLR of the group mobile switchboard number, the HLR of the group mobile switchboard number returning SRI acknowledge (SRI_ack), which includes Terminating CAMEL Subscription Information (T-CSI), the GMSC/MSC which triggers the intelligent service triggering a mobile terminated of the intelligent service to a home SCP of the group mobile switchboard, by sending an IDP message;

b. when determining that the called number is a mobile switchboard number of a certain group, the home SCP of the group mobile switchboard sending a request report BCSM event (RRBE) message to the GMSC/MSC which triggers the intelligent service, requesting the GMSC/MSC which triggers the intelligent service to monitor a calling party abandon event (if the calling party abandons the current call before the called extension subscriber answers in the subsequent call process, the GMSC/MSC which triggers the intelligent service reporting the calling party abandon event to the home SCP of the group mobile switchboard);

c. the home SCP of the group mobile switchboard sending an Establish Temporary Connection (ETC) message to the GMSC/MSC which triggers the intelligent service, instructing the GMSC/MSC which triggers the intelligent service to establish a connection to a group mobile switchboard IP;

d. after the GMSC/MSC which triggers the intelligent service has established a connection to the group mobile switchboard IP, the group mobile switchboard IP sending an Assist Request Instructions (ARI) message to the home SCP of the group mobile switchboard, informing the home SCP of the group mobile switchboard that the voice channel is connected to the group mobile switchboard IP;

e. the home SCP of the group mobile switchboard sending a script Run (SR) message to the group mobile switchboard IP, instructing the group mobile switchboard IP to execute a script program for interaction with the calling party;

f. the group mobile switchboard IP determining the real number of the extension subscriber to be transferred to by interacting with the calling party (wherein the identification of the extension subscriber may be obtained through inputting by the calling party, voice-recognition by the group mobile switchboard, or search by a manual agent), and then the group mobile switchboard IP encapsulating the determined identification of the extension subscriber to be transferred to into a script Event (SE) message to report to the home SCP of the group mobile switchboard;

g. after receiving the identification of the extension subscriber to be transferred to, the home SCP of the group mobile switchboard sending a script Close (SC) message to the group mobile switchboard IP, instructing the group mobile switchboard IP to release script resources;

h. the home SCP of the group mobile switchboard sending a Disconnect Forward Connection (DFC) message to the GMSC/MSC which triggers the intelligent service, instructing the GMSC/MSC which triggers the intelligent service to cut off the connection to the group mobile switchboard IP;

i. the home SCP of the group mobile switchboard sending an RRBE message to the GMSC/MSC which triggers the intelligent service, requesting the GMSC/MSC which triggers the intelligent service to monitor an event, such as hanging up, no answer from the called party or routing selection failure;

j. the home SCP of the group mobile switchboard sending an Apply Charging (AC) message to the GMSC/MSC which triggers the intelligent service, requesting the GMSC/MSC to monitor talk time.

k. the home SCP of the group mobile switchboard sending a CONNECT message to the GMSC/MSC which triggers the intelligent service, instructing the GMSC/MSC which triggers the intelligent service to connect to the called extension subscriber;

l. the GMSC/MSC which triggers the intelligent service connecting the call to the called extension subscriber, and the GMSC/MSC which triggers the intelligent service report the talk time to the home SCP of the group mobile switchboard after the talk is over via an Apply Charging Report (ACR) message, according to which the home SCP of the group mobile switchboard collects the transfer fee for the group mobile switchboard number;

m. the GMSC/MSC which triggers the intelligent service reporting an event such as hanging-up, etc., to the home SCP of the group mobile switchboard via an Event Report BCSM (ERB) message;

n. the home SCP of the group mobile switchboard sending a Release Call (RC) message to the GMSC/MSC which triggers the intelligent service, instructing the GMSC/MSC to release the call, and break off the current control relationship between the home SCP of the group mobile switchboard and the GMSC/MSC which triggers the intelligent service.

Figure 9:
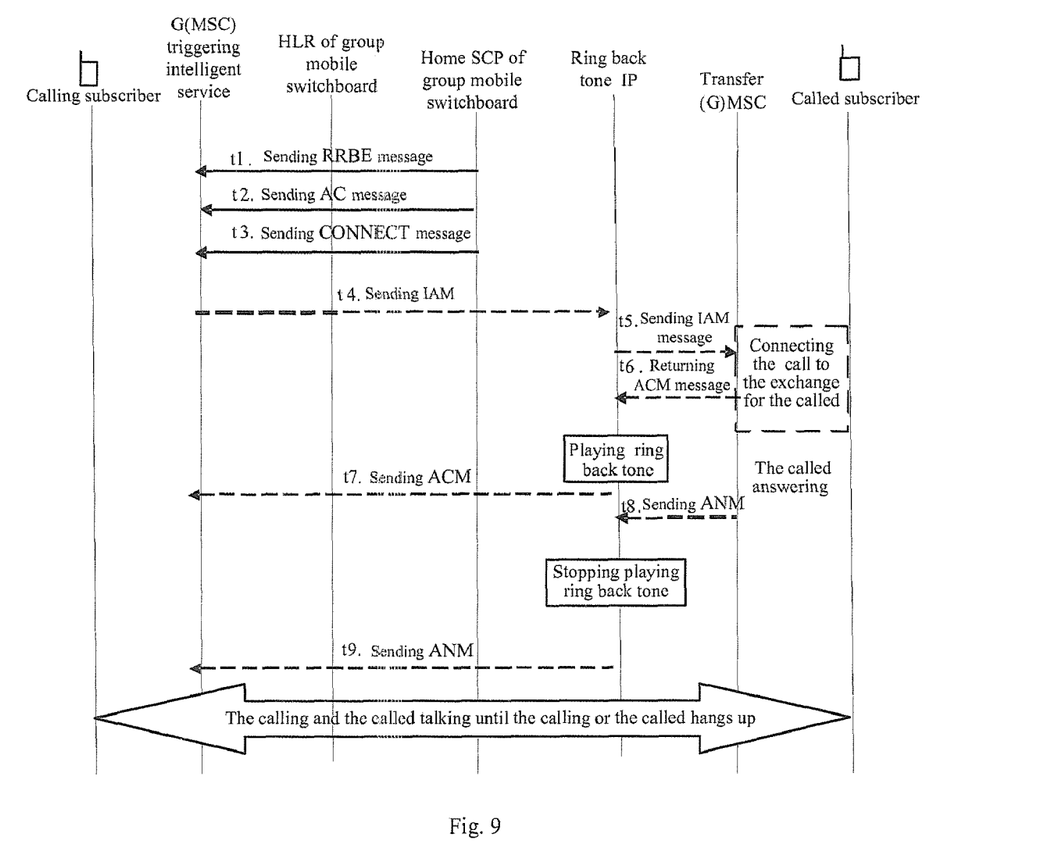
FIG. 9 is a schematic diagram illustrating the connecting process when a network system plays a group ring back tone for a calling party during the transfer from a switchboard to an extension, according to an embodiment of the present invention.

During the process illustrated in FIG. 8, after the home SCP of the group mobile switchboard has obtained the identification of the called extension subscriber which the calling party is to call, the ring back tone IP will play a ring back tone subscribed to by the group customer for the calling party during the transfer from the switchboard to the extension, according to the principle of the present invention. FIG. 9 is a schematic diagram illustrating the connecting process when a network system plays a group ring back tone for a calling party during the transfer from a switchboard to an extension, according to an embodiment of the present invention, and the connecting process thereof is detailed as follows:

t1. a home SCP of a group mobile switchboard sending an RRBE message to a GMSC/MSC which triggers the intelligent service, requesting the GMSC/MSC to monitor an event such as abandoning of the calling party, hanging up, no answer from the called party, routing selection failure, etc.;

t2. the home SCP of the group mobile switchboard sending an AC message to the GMSC/MSC which triggers the intelligent service, instructing it the GMSC/MSC to monitor talk time;

t3. when determining that the group mobile switchboard number has been subscribed to a group ring back tone service, the home SCP of the group mobile switchboard sending a CONNECT message to the GMSC/MSC which triggers the intelligent service, instructing the GMSC/MSC to connect to a ring back tone IP; wherein the parameters included in the CONNECT message are shown in the following table:

| Name of information unit (parameter) | Meaning of parameter | Value or description of parameter |
|---|---|---|
| destinationRoutingAddress | Destination routing address: the GMSC/MSC replacing the called number during a call with this parameter | The routing information for connecting to the IP + the called extension's MSISDN |
| redirectingPartyID | Redirecting number: the GMSC/MSC replacing the redirecting number during a call with this parameter | The group mobile switchboard's MSISDN |
| redirectionInformation | Redirection Information: the GMSC/MSC replacing the redirection information during a call with this parameter | Cause and times of forwarding 00110011, 00110001 |
| originalCalledPartyID | Original called party's number: the GMSC/MSC replacing the original called party's number during a call with this parameter | The group mobile switchboard's MSISDN | t4. the GMSC/MSC which triggers the intelligent service routing the call to the ring back tone IP, according to routing information of the IP, which is located before the called extension number in the destination routing address contained in the received CONNECT message;

t5. the ring back tone IP removing the IP routing information, the redirecting number and the redirection information from the CONNECT message, and then encapsulating the remainder of the identification of the called extension subscriber into an IAM message to send to a transfer GMSC/MSC, so as to connect the call to the transfer GMSC/MSC (transfer to different GMSC/MSC according to different identification of the called extension subscriber);

t6. the transfer GMSC/MSC continuing to connect the call to a VMSC of the called extension subscriber (if the called extension subscriber is a subscriber of another network, the transfer GMSC/MSC connects the call to the another network, which in turn makes a connection to the called extension subscriber; if the called extension subscriber is a subscriber of the network within which the system locates, after obtaining a MSRN of the called extension subscriber from an HLR of the called extension subscriber, the transfer GMSC/MSC connects the call to a VMSC of the called extension subscriber according to the obtained MSRN of the called extension subscriber), and forwarding an ACM returned from the called side to the ring back tone IP;

t7. the ring back tone IP forwarding the ACM to the calling side, and when determining that the status of the called extension subscriber which the ACM carries is idle, blocking a ring back tone played by the called side (a normal ring back tone or a subscriber-based ring back tone subscribed to by the called extension subscriber individually), choosing a corresponding group ring back tone according to the group mobile switchboard number dialed by the calling party or a relationship between the group mobile switchboard number dialed by the calling party and an identification of the calling party (in the case that the same group mobile switchboard can subscribe to different ring back tones for different calling parties), for playing for the calling party side;

t8. after the called extension subscriber answers, the called side sending an ANM to the transfer GMSC/MSC, and the transfer GMSC/MSC sending the received ANM to the ring back tone IP;

T9. the ring back tone IP continuing to forward the ANM after receiving the ANM, and stopping playing the subscribed group ring back tone to the calling party side; a talk between the calling party and the called extension subscriber beginning.

The present invention provides a system for implementing a ring back tone based on a group mobile switchboard service, including a home service control point of the group mobile switchboard, a gateway mobile switching center/mobile switching center which triggers the intelligent service, a ring back tone intelligent peripheral and a visited mobile switching center of a called extension subscriber; wherein after obtaining an identification of the called extension subscriber which the calling party calls, the home service control point of the group mobile switchboard is used to send routing information of the ring back tone intelligent peripheral and the identification of the called extension subscriber respectively to the gateway mobile switching center/mobile switching center which triggers the intelligent service;

the gateway mobile switching center/mobile switching center which triggers the intelligent service is used to route the identification of the called extension subscriber to the ring back tone intelligent peripheral according the received routing information of the ring back tone intelligent peripheral;

the ring back tone intelligent peripheral is used to connect the call to the visited mobile switching center of the called extension subscriber, and play a group ring back tone subscribed to by the group customer for the calling party.

The system also includes an intelligent peripheral of the group mobile switchboard, which is used to interact with the calling party via the gateway mobile switching center/mobile switching center which triggers the intelligent service, to obtain the identification of the extension subscriber called by the calling party, and to encapsulate the obtained identification of the extension subscriber into a script event message to report to the home service control point of the group mobile switchboard.

The ring back tone intelligent peripheral determines a home location register of the called extension subscriber according to the received identification of the called extension subscriber, obtains a mobile station roaming number of the called extension subscriber from the home location register of the called extension subscriber, and determines the visited mobile switching center of the called extension subscriber according to the obtained mobile station roaming number of the called extension subscriber.

The system also includes a transfer gateway mobile switching center/mobile switching center; the ring back tone intelligent peripheral forwards the identification of the called extension subscriber to the corresponding transfer gateway mobile switching center/mobile switching center according to the received identification of the called extension subscriber; the transfer gateway mobile switching center/mobile switching center determines the visited mobile switching center of the called extension subscriber according to the received identification of the called extension subscriber.

The ring back tone intelligent peripheral determines the group ring back tone according to a group mobile switchboard number dialed by the calling party, or according to a relationship between a group mobile switchboard number dialed by the calling party and an identification of the calling party.

It is obvious to the skilled in the art that various variations and modifications may be made to the present invention within the spirit and scope of the present invention, and it is intended that the present invention covers these variations and modifications provided that they fall within the scope of the present invention as defined by the appended claims and their equivalents.

What is claimed is:

1. A method of implementing a ring back tone based on a group mobile switchboard service, the method comprising:

obtaining, by a home service control point of the group mobile switchboard, an identification of a called extension subscriber which a calling party calls:

sending routing information of a ring back tone intelligent peripheral and the identification of the called extension subscriber to a gateway mobile switching center or mobile switching center which triggers the intelligent service;

routing the identification of the called extension subscriber to the ring back tone intelligent peripheral according to the routing information of the ring back tone intelligent peripheral, by the gateway mobile switching center or mobile switching center which triggers the intelligent service:

connecting the call to a visited mobile switching center of the called extension subscriber, by the ring back tone intelligent peripheral;

playing a group ring back tone subscribed to by the group customer for the calling party; and wherein the process of obtaining an identification of a called extension subscriber comprises the following steps:

dialing, by a calling party, a group mobile switchboard number which has been applied for a group ring back tone;

performing interaction between an intelligent peripheral of the group mobile switchboard and the calling party via a gateway mobile switching center or mobile switching center which triggers the intelligent service, obtaining the identification of the extension subscriber which the calling party calls;

encapsulating the identification of the extension subscriber into a script event message to report to the home service control point of the group mobile switchboard, by the intelligent peripheral of the group mobile switchboard.

2. A method of implementing a ring back tone based on a group mobile switchboard service comprising:

obtaining, by a home service control point of the group mobile switchboard, an identification of a called extension subscriber which a calling party calls;

sending routing information of a ring back tone intelligent peripheral and the identification of the called extension subscriber to a gateway mobile switching center or mobile switching center which triggers the intelligent service;

routing the identification of the called extension subscriber to the ring back tone intelligent peripheral according to the routing information of the ring back tone intelligent peripheral, by the gateway mobile switching center or mobile switching center which triggers the intelligent service;

connecting the call to a visited mobile switching center of the called extension subscriber by the ring back tone intelligent peripheral;

playing a group ring back tone subscribed to by the group customer for the calling party;

after connecting the call to a visited mobile switching center of the called extension subscriber, the method further comprises: calling the called extension subscriber, and playing a ring back tone for the ring back tone intelligent peripheral before the called extension subscriber answers, by the visited mobile switching center of the called extension subscriber; and while playing a group ring back tone subscribed to by the group customer for the calling party by the ring back tone intelligent peripheral, blocking the ring back tone played by the visited mobile switching center of the called extension subscriber.

3. The method of implementing a ring back tone based on a group mobile switchboard service according to claim 2, wherein the method further comprises:

sending an address complete message bearing status information of the called extension subscriber to the ring back tone intelligent peripheral by the visited mobile switching center of the called extension subscriber, before answering by the called extension subscriber;

before playing a group ring back tone for the calling party, the method further comprises:

determining whether the current status of the called extension subscriber is idle according to the status information of the called extension subscriber borne in the address complete message sent from the visited mobile switching center of the called extension subscriber, by the ring back tone intelligent peripheral.

4. The method of implementing a ring back tone based on a group mobile switchboard service according to claim 2, wherein when connecting the call to a visited mobile switching center of the called extension subscriber, the visited mobile switching center of the called extension subscriber is determined by the ring back tone intelligent peripheral according to the identification of the called extension subscriber.

5. The method of implementing a ring back tone based on a group mobile switchboard service according to claim 2, wherein when connecting the call to a visited mobile switching center of the called extension subscriber, the identification of the called extension subscriber is forwarded to a corresponding transfer gateway mobile switching center or mobile switching center the ring back tone intelligent peripheral forwards according to the identification of the called extension subscriber;

the visited mobile switching center of the called extension subscriber is determined by the transfer gateway mobile switching center or mobile switching center according to the identification of the called extension subscriber.

6. The method of implementing a ring back tone based on a group mobile switchboard service according to claim 2, wherein the group ring back tone played for the calling party is determined by the ring back tone intelligent peripheral according to the group mobile switchboard number dialed by the calling party, or according to a relationship between the group mobile switchboard number dialed by the calling party and an identification of the calling party.

7. A method of implementing a ring back tone based on a group mobile switchboard service, comprising:

obtaining, by a home service control point of the group mobile switchboard, an identification of a called extension subscriber which a calling party calls;

sending routing information of a ring back tone intelligent peripheral and the identification of the called extension subscriber to a gateway mobile switching center or mobile switching center which triggers the intelligent service;

routing the identification of the called extension subscriber to the ring back tone intelligent peripheral according to the routing information of the ring back tone intelligent peripheral, by the gateway mobile switching center or mobile switching center which triggers the intelligent service;

connecting the call to a visited mobile switching center of the called extension subscriber, by the ring back tone intelligent peripheral;

playing a group ring back tone subscribed to by the group customer for the calling party;

wherein when connecting the call to a visited mobile switching center of the called extension subscriber, the visited mobile switching center of the called extension subscriber is determined by the ring back tone intelligent peripheral according to the identification of the called extension subscriber; and wherein the process of determining the visited mobile switching center of the called extension subscriber according to the identification of the called extension subscriber comprises:

determining a home location register of the called extension subscriber according to the identification of the called extension subscriber, by the ring back tone intelligent peripheral;

obtaining a mobile station roaming number of the called extension subscriber from the home location register of the called extension subscriber;

determining the visited mobile switching center of the called extension subscriber according to the mobile station roaming number of the called extension subscriber by the ring back tone intelligent peripheral.

8. The method of implementing a ring back tone based on a group mobile switchboard service according to claim 7, wherein after playing a group ring back tone subscribed to by the group customer for the calling party by the ring back tone intelligent peripheral, the method further comprises:

answering by the called extension subscriber and sending an answer message to the ring back tone intelligent peripheral by the visited mobile switching center of the called extension subscriber;

forwarding the answer message to the gateway mobile switching center or mobile switching center which triggers the intelligent service by the ring back tone intelligent peripheral, and stopping playing the group ring back tone for the calling party.

9. A method of implementing a ring back tone based on a group mobile switchboard service, comprising:

obtaining, by a home service control point of the group mobile switchboard, an identification of a called extension subscriber which a calling party calls;

sending routing information of a ring back tone intelligent peripheral and the identification of the called extension subscriber to a gateway mobile switching center or mobile switching center which triggers the intelligent service;

routing the identification of the called extension subscriber to the ring back tone intelligent peripheral according to the routing information of the ring back tone intelligent peripheral, by the gateway mobile center or mobile switching center which triggers the intelligent service;

connecting the call to a visited mobile switching center of the called extension subscriber, by the ring back tone intelligent peripheral;

playing a group ring back tone subscribed to by the group customer for the calling party; and wherein when connecting the call to a visited mobile switching center of the called extension subscriber, the identification of the called extension subscriber is forwarded to a corresponding transfer gateway mobile switching center or mobile switching center by the ring back tone intelligent peripheral according to the identification of the called extension subscriber;

the visited mobile switching center of the called extension subscriber is determined by the transfer gateway mobile switching center or mobile switching center according to the identification of the called extension subscriber.

10. The method of implementing a ring back tone based on a group mobile switchboard service according to claim 9, wherein the process of determining the visited mobile switching center of the called extension subscriber according to the identification of the called extension subscriber comprises:

determining a home location register of the called extension subscriber according to the identification of the called extension subscriber, by the transfer gateway mobile switching center or mobile switching center;

obtaining a mobile station roaming number of the called extension subscriber from the home location register of the called extension subscriber;

determining the visited mobile switching center of the called extension subscriber according to the mobile station roaming number of the called extension subscriber by the transfer gateway mobile switching center or mobile switching center.

11. The method of implementing a ring back tone based on a group mobile switchboard service according to claim 10, wherein after playing a group ring back tone subscribed to by the group customer for the calling party by the ring back tone intelligent peripheral, the method further comprises:

answering by the called extension subscriber and sending a answer message to the transfer gateway mobile switching center or mobile switching center by the visited mobile switching center of the called extension subscriber;

forwarding the answer message to the ring back tone intelligent peripheral by the transfer gateway mobile switching center or mobile switching center;

forwarding the answer message to the gateway mobile switching center or mobile switching center which triggers the intelligent service by the ring back tone intelligent peripheral, and stopping playing the group ring back tone for the calling party.

12. A system configured to implement a ring back tone based on a group mobile switchboard service, comprising a home service control point of a group mobile switchboard, a gateway mobile switching center or mobile switching center which triggers the intelligent service, a ring back tone intelligent peripheral and a visited mobile switching center of a called extension subscriber; wherein upon obtaining an identification of the called extension subscriber which the calling party calls, the home service control point of the group mobile switchboard serves to send routing information of the ring back tone intelligent peripheral and the identification of the called extension subscriber to the gateway mobile switching center or mobile switching center which triggers the intelligent service;

the gateway mobile switching center or mobile switching center which triggers the intelligent service serves to route the identification of the called extension subscriber to the ring back tone intelligent peripheral according the routing information of the ring back tone intelligent peripheral;

the ring back tone intelligent peripheral serves to connect the call to the visited mobile switching center of the called extension subscriber, and play a group ring back tone subscribed to by the group customer for the calling party; and wherein the ring back tone intelligent peripheral determines a home location register of the called extension subscriber according to the identification of the called extension subscriber, obtains a mobile station roaming number of the called extension subscriber from the home location register of the called extension subscriber, and determines the visited mobile switching center of the called extension subscriber according to the mobile station roaming number of the called extension subscriber.

* * * * *